No. 824,156. PATENTED JUNE 26, 1906.
A. J. SMITH.
DINNER PAIL.
APPLICATION FILED JULY 25, 1904.
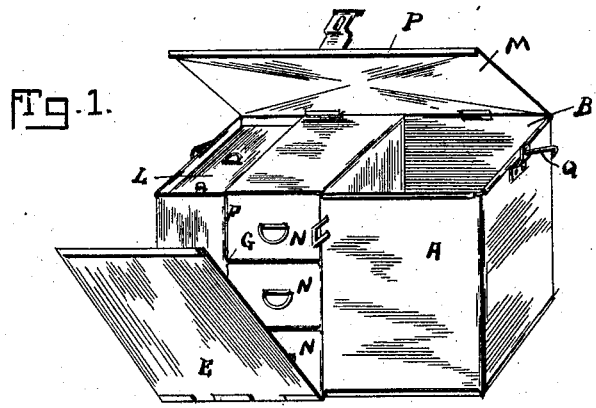
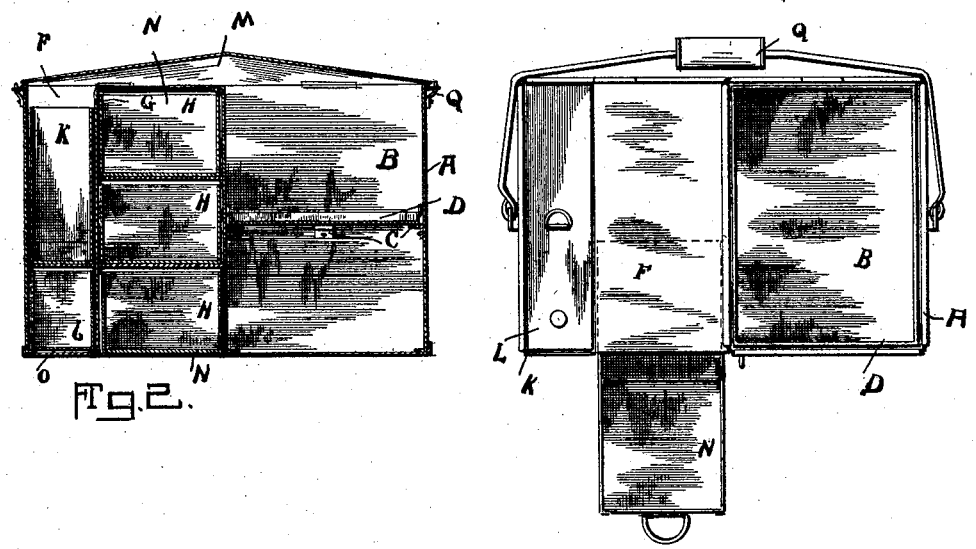
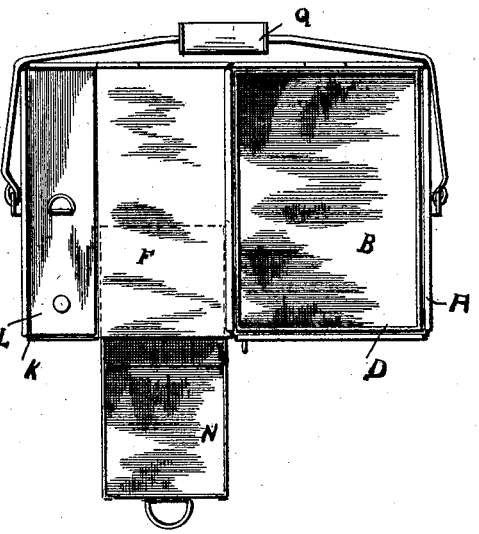
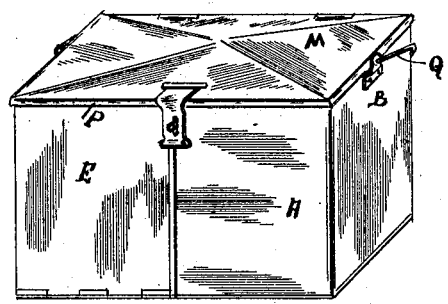
Witnesses
J. Mason Mangham.
May E. Moore.
Inventor
Arthur J. Smith
By David P. Moore
Attorney

UNITED STATES PATENT OFFICE.

ARTHUR J. SMITH, OF HAZLETON, PENNSYLVANIA.

DINNER-PAIL.

No. 824,156.     Specification of Letters Patent.     Patented June 26, 1906.

Application filed July 25, 1904. Serial No. 218,158.

*To all whom it may concern:*

Be it known that I, ARTHUR J. SMITH, a citizen of the United States, residing at Hazleton, in the county of Luzerne and State of Pennsylvania, have invented certain new and useful Improvements in Dinner-Pails, of which the following is a specification.

This invention relates to improvements in dinner-pails; and the main object of my invention is the provision of a compartment-pail which is so arranged as to compactly hold whatever may be desired and which is of such a simple construction as to render itself thoroughly efficient and practical in use.

It is an object of the invention to render the pail not only peculiarly adapted to carrying the meats, vegetables, &c., of a meal in compact and accessible form, but also for carrying a liberal supply of breadstuff in such a manner that the crumbs thereof will not scatter from the pail. To this end the pail is preferably divided vertically into two compartments, one of which opens through the side of the pail and is provided with a plurality of superposed drawers or slides for receiving vegetables and the like, while the other is closed at the sides and open only at the top, so that bread or cake placed therein cannot scatter crumbs through the sides of the pail. The first compartment is provided with a cover hinged at the bottom, and the second is likewise provided with a cover, but hinged at the back of the pail. This latter cover has at its front edge a depending flange, which clasps the front wall of the pail-body and also the upper free end of the other cover to retain the latter in closed position. I regard this as constituting an essential feature of novelty in my invention. Locking means is also provided for securing the top cover in closed position, so that the locking means retains the top cover, and this top cover holds the side cover. By preference the compartment, which is open at the side, is also open at the top for one reason, so that an upright can for coffee and the like may be conveniently inserted therein and removed therefrom. This being the case I find it advantageous to make the top cover extend over the tops of both compartments, and this feature of the invention may be said to consist in the association with the upright cover for the open side of one compartment of a horizontal cover common to both compartments and constructed to hold the first cover closed.

In the accompanying drawings, Figure 1 is a perspective view of the pail open. Fig. 2 is a longitudinal sectional view thereof. Fig. 3 is a top plan view of the same with the cover removed and some of the receptacles removed. Fig. 4 is a perspective of the pail closed.

Referring to the drawings, A designates a rectangular casing, which is provided upon one side thereof with a bread and cake compartment B, said compartment having within the same near the top the studs or projections C for the reception of the removable cake-tray D. Hinged to the bottom, upon the opposite side of the pail, is a leaf or table E, which is adapted to swing outward, so as to render the compartment side F of the pail accessible. The compartment side is divided by the framework G into the three vertically-arranged compartments H, the lower smaller compartment J, and the upper compartment K, which is provided with an open upper end in order that the coffee tank or can L may be removably rested within the said compartment in such a manner as to allow the cover M of the pail to be conveniently closed.

Slidably mounted in the three vertical compartments are the drawers or trays N, and in the lower smaller compartment is mounted the small drawer O. This drawer is for the reception of knives, forks, and spoons, while the other three compartments are for the different varieties of vegetables.

It will be noticed that the hinged leaf or table when in its normal position is folded upward and is substantially parallel with the front of the bread-compartment, so that the rim P of the cover which extends entirely along the front edge of this top cover will clasp the upper edge of the upright leaf or cover E. It is to be noted that this rim or flange has a dual function. That portion which extends along the front of the bread or cake compartment serves to make a tight joint for this compartment, thereby aiding in keeping the contents fresh, while the remaining portion of the flange, as already noted, secures the upright cover in place.

The front wall of the bread or cake compartment B is provided with a projecting staple B', which is engaged by a hasp B² on the forward edge of cover M.

In order that the pail may be carried with ease, I provide a handle Q for that purpose.

From the foregoing description, taken in connection with the drawings, it is evident that I provide a dinner-pail which is the embodiment of simplicity, durability, and inexpensiveness and one which is therefore thoroughly efficient and practical in use.

What I claim as new is—

1. A dinner-pail, comprising a substantially rectangular body provided with two compartments, one opening through the top and front of the body and the other opening through the top only thereof, a leaf member hinged at the bottom of the body to cover the open side of the first-named compartment, a horizontal hinged cover arranged to overlie the open tops of both compartments and being provided with a depending flange arranged to clasp the upper edge of said leaf member to hold the same closed, and means for securing said cover in closed position, substantially as described.

2. A dinner-pail, comprising an oblong body divided vertically and transversely into two compartments, one opening through the top and front of the body and the other opening through the top only, a leaf member hinged at the bottom of the body to cover the open front of the first-named compartment, a horizontal cover hinged to the back of the body and common to the open tops of both compartments and being provided along its front edge with a depending flange arranged to clasp at one side the upper edge of said leaf member to hold the same closed and at the other side the front of the body to effect a tight joint for the adjacent compartment, and means for securing said cover in closed position, substantially as described.

3. A dinner-pail, comprising an oblong body provided internally with a transverse vertical division-wall forming two compartments, the body being entirely open at top and in front at one side of said division-wall, a leaf member hinged at the bottom of the body and proportioned to fit and cover the opening in the front of the body, a cover hinged at the back of the body to overlie the entire top thereof and being provided along its front edge with a depending flange for clasping at one side the front of the body and at the other side the upper edge of said leaf member, and means for securing said cover in closed position, whereby the latter is retained in closed position, substantially as described.

4. A dinner-pail, comprising an oblong body provided internally with a transverse vertical division-wall forming two compartments, the body being entirely open at top and in front at one side of said division-wall, a plurality of superposed slides and a liquid-containing vessel disposed within the compartment open at top and front, a leaf member hinged at the bottom of the body and proportioned to fit and cover the opening in the front thereof and being provided along its front edge with a depending flange for clasping at one side the front of the body and at the other side the upper edge of said leaf member, a hasp upon said cover, and a coöperating staple on the front of the pail-body, substantially as described.

In testimony whereof I affix my signature in presence of two witnesses.

ARTHUR J. SMITH.

Witnesses:
C. F. HILL,
M. H. SIMMONS.